(12) United States Patent
Konno et al.

(10) Patent No.: US 6,347,102 B1
(45) Date of Patent: Feb. 12, 2002

(54) WAVELENGTH CONVERSION LASER AND A MACHINING DEVICE USING THE SAME

(75) Inventors: Susumu Konno; Koji Yasui; Kenji Kumamoto; Kuniaki Iwashiro, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/441,554

(22) Filed: Nov. 17, 1999

(30) Foreign Application Priority Data

Nov. 18, 1998 (JP) .......................... 10-328169

(51) Int. Cl.$^7$ ................................. H01S 3/10
(52) U.S. Cl. ...................... 372/22; 372/23; 372/10; 372/98
(58) Field of Search .................. 372/22, 10, 23, 372/98, 21

(56) References Cited

U.S. PATENT DOCUMENTS

| | | | | |
|---|---|---|---|---|
| 3,721,831 A | * | 3/1973 | Bergman | 307/88.3 |
| 4,346,314 A | | 8/1982 | Craxton | |
| 5,130,997 A | * | 7/1992 | Ortiz | 372/21 |
| 5,278,852 A | | 1/1994 | Wu et al. | |
| 5,289,491 A | * | 2/1994 | Dixon | 372/92 |
| 5,333,142 A | * | 7/1994 | Scheps | 372/22 |
| 5,408,481 A | * | 4/1995 | Scheps | 372/22 |
| 5,412,674 A | * | 5/1995 | Scheps | 372/22 |
| 5,673,281 A | * | 9/1997 | Byer | 372/3 |
| 5,835,513 A | * | 11/1998 | Pieterse | 372/22 |
| 6,026,102 A | * | 2/2000 | Shimoji | 372/22 |
| 6,088,380 A | * | 7/2000 | Lawandy | 372/102 |
| 6,097,742 A | * | 8/2000 | Capara | 372/22 |
| 6,137,624 A | * | 10/2000 | Taira | 359/326 |

FOREIGN PATENT DOCUMENTS

| | | |
|---|---|---|
| DE | 25 22 338 | 12/1975 |
| DE | 195 06 608 | 8/1996 |
| DE | 42 29 397 | 11/1996 |
| JP | 8-250797 | 9/1996 |
| WO | WO 97/45902 | 12/1997 |

OTHER PUBLICATIONS

Anthony J. Alfrey, Conference on Lasers and Electro–Optics (CLEO) '97, Post Deadline Papers, pp. CPD19–2 to CPD19–5.

CLEO '97, Technical Digest, CFL4, p. 542.

Lew Goldberg, et al., Optics Letters, vol. 20, No. 15, pp. 1640–1642, "Tunable UV Generation at 286 NM by Frequency Tripling of a High–Power Mode–Locked Semiconductor Laser", Aug. 1, 1995

* cited by examiner

*Primary Examiner*—James W. Davie
*Assistant Examiner*—Gioacchino Inzirillo
(74) *Attorney, Agent, or Firm*—Oblon, Spivak, McClelland, Maier & Neustadt, P.C.

(57) ABSTRACT

A wavelength conversion laser for generating sum frequency laser beam comprising a laser resonator, a solid-state laser active medium, a second harmonic generation wavelength conversion crystal and a sum frequency generation wavelength conversion crystal, wherein the length of the second harmonic generation wavelength conversion crystal along the optical axis is set to be shorter than that of the sum frequency generation wavelength conversion crystal.

14 Claims, 15 Drawing Sheets

ANGLE OF A SECOND HARMONIC GENERATION
WAVELENGTH CONVERSION CRYSTAL $(\theta - \theta_0)$ ANGLE OF A SECOND HARMONIC GENERATION
WAVELENGTH CONVERSION CRYSTAL ($\theta - \theta_0$)

ANGLE OF A SECOND HARMONIC GENERATION
WAVELENGTH CONVERSION CRYSTAL ($\theta - \theta_0$)

WAVELENGTH CONVERSION LASER AND A MACHINING DEVICE USING THE SAME

BACKGROUND OF THE INVENTION

The present invention relates to a wavelength conversion laser which can generate a sum frequency laser beam of high output power and high focusibility in a stable manner with high reproducibility, and a laser machining device.

FIG. 15 is a schematic view showing a construction of a conventional wavelength conversion laser, for example, shown in Japanese Laid-Open Patent Application No. 148096/1975 (Tokukaishou 50-148096). In FIG. 15, reference numeral 1 is a laser resonator mirror having a high reflectivity with respect to a fundamental laser beam, 3 is a solid-state laser active medium, 6c is a second harmonic generation wavelength conversion crystal, 7c is a sum frequency generation (third harmonic generation) conversion crystal, 9 is a laser resonator mirror, having a high reflectivity with respect to the second harmonic laser beam and the fundamental laser beam, and 18 is a mirror which has a high reflectivity to the fundamental laser beam and also has a high transmittance to the second harmonic and sum frequency laser beam.

In the wavelength conversion laser shown in FIG. 15, a fundamental laser beam, generated by a laser resonator consists of the laser resonator mirrors 1, 9 and the mirror 18 and the solid-state laser active medium 3, is partially converted into a second harmonic laser beam by the second harmonic generation wavelength conversion crystal 6c placed inside the laser resonator, and one portion of the second harmonic laser beam thus generated and one portion of the fundamental laser beam are converted into a third harmonic laser beam serving as a sum frequency laser beam by the sum frequency generation wavelength conversion crystal 7c. The second harmonic laser beam (2ω) that has not been wavelength-converted and the third harmonic laser beam (3ω) are extracted from the mirror 18. In the wavelength conversion laser as described above that inserts the sum frequency generation wavelength conversion crystal and the second harmonic generation wavelength conversion crystal into the laser resonator so as to generate the sum frequency laser beam, the output of the sum frequency laser beam is maximized by alternately adjusting the angle and temperature of the respective wavelength conversion crystals.

In case when as shown in FIG. 15, the wavelength conversion laser for generating the sum frequency laser beam is constructed by inserting the second harmonic generation wavelength conversion crystal and the sum frequency generation wavelength conversion crystal into the laser resonator. However, the wavelength conversion efficiency varies depending on the angle of the wavelength conversion crystal and the temperature, with the result that the characteristics of the fundamental laser beam within the laser resonator also vary; therefore, it is difficult to construct such a device with high reproducibility. The complexity and difficulty in constructing such a device is far greater than those in constructing a fundamental laser beam generation device and those in constructing a second harmonic laser beam generation device, having only one wavelength conversion crystal inside the laser resonator. Moreover, Patent Gazette No. 2654728, etc. also disclose wavelength conversion lasers in which a wavelength conversion crystal is placed inside the laser resonator; however, like those shown in FIG. 15, it is difficult to provide a device with high reproducibility even by the application of these devices.

The above-mentioned complexity in the output power variation of the wavelength conversion laser that depends on the angle and the temperature of the wavelength conversion crystals and obstacles that are inevitable in manufacturing the devices, such as variations in parts and differences in the capability of individual workers, have made it difficult to manufacture and mass-produce wavelength conversion lasers in factories, etc. Moreover, complex working processes, which are required for production and maintenance for the device, have made the production costs higher. Furthermore, skilled workers are required.

In case when a laser beam, generated by the above-mentioned wavelength conversion laser, is used for machining, if a constituent part of the laser (such as a semiconductor laser and a lamp for a pumping light source, a wavelength conversion crystal and an optical part such as a mirror) is damaged and an exchange is required, time-consuming adjustments have to be carried out on the optical system and the resonator, and it is sometimes difficult to reproduce the same machining result as before the repairing even in case of machining under the same operation conditions, since the laser does not reproduce the same state as before the repairing.

SUMMARY OF THE INVENTION

The wavelength conversion laser in accordance with claim 1 of the present invention, which is a wavelength conversion laser for obtaining a sum frequency laser beam by placing a second harmonic generation wavelength generation conversion crystal and a sum frequency generation wavelength conversion crystal inside a laser resonator, is characterized in that the second harmonic generation wavelength conversion crystal that is shorter than the sum frequency generation wavelength conversion crystal is adopted.

Moreover, the laser in accordance with claim 2, which is the same laser as claim 1, is characterized in that the sum frequency generation wavelength conversion crystal serves as a third harmonic generation wavelength conversion crystal.

Furthermore, the laser in accordance with claim 3, which is the same wavelength conversion laser as claim 1, is characterized in that the sum frequency generation wavelength conversion crystal is made of a plurality of wavelength conversion crystals.

The laser in accordance with claim 4, which is the same wavelength conversion laser as claim 3, is characterized in that the sum frequency generation wavelength conversion crystals are two wavelength conversion crystals so as to generate fourth harmonic laser beam.

Moreover, the laser in accordance with claim 5, which is the same wavelength conversion laser device as claim 1, is characterized in that the sum frequency generation wavelength conversion crystal is placed between the solid-state laser active medium and the second harmonic generation wavelength conversion crystal.

Furthermore, the laser in accordance with claim 6, which is the same wavelength conversion laser as claim 1, is characterized in that a resonator Q-value modulating element is placed inside a laser resonator.

The laser in accordance with claim 7, which is the same wavelength conversion laser as claim 1, is characterized in that a device, which can finely adjust the angle of at least one of the wavelength conversion crystals with a precision of not more than ±0.1 degree, is installed.

Moreover, the laser in accordance with claim 8, which is the same wavelength conversion laser as claim 1, is characterized in that a device, which can finely adjust the temperature of at least one of the wavelength conversion crystals with a precision of not more than ±0.5 degree centigrade, is installed.

Furthermore, the laser in accordance with claim 9, which is the same wavelength conversion laser as claim 1, is characterized in that a polarization controlling element is placed inside the laser resonator.

The laser in accordance with claim 10, which is the same wavelength conversion laser as claim 1, is characterized in that Nd:YAG or Nd:YLF or Nd:YVO$_4$ is used as the solid-state laser active medium.

The laser in accordance with claim 11, which is the same wavelength conversion laser as claim 1, is characterized in that LBO (LiB$_3$O$_5$) crystal is used at least either as the second harmonic generation wavelength conversion crystal or as the sum frequency generation wavelength conversion crystal.

Moreover, the laser in accordance with claim 12, which is the same wavelength conversion laser as claim 1, is characterized in that the sum frequency laser beam average output power is not less than 1 W.

Furthermore, the laser in accordance with claim 13, which is the same wavelength conversion laser as claim 1, is characterized in that the second harmonic generation wavelength conversion crystal and the sum frequency generation wavelength conversion crystal are formed into an integrated wavelength conversion element so as to integrally vary the temperature or angle of the second harmonic generation wavelength conversion crystal and the sum frequency generation wavelength conversion crystal.

The machining device in accordance with claim 14 is a laser machining device for machining a machining object by using a wavelength conversion laser beam generated by the wavelength conversion laser disclosed in claim 1 as a light source.

DETAILED DESCRIPTION

Embodiment 1

Figure 1:
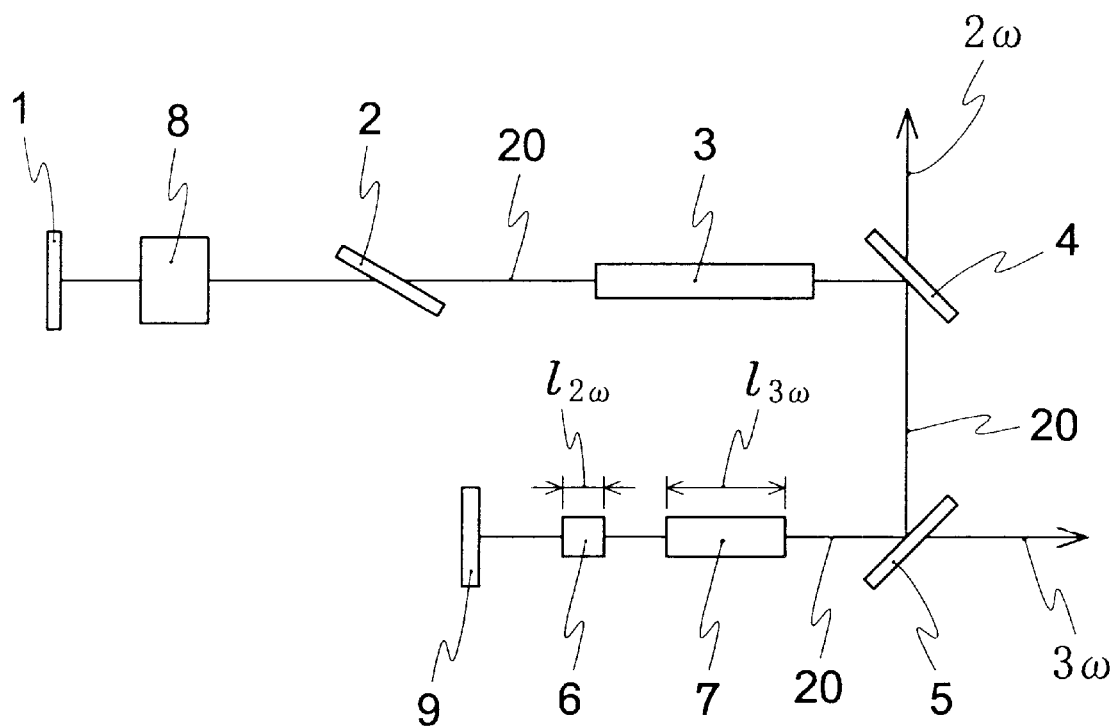
FIG. 1 is a drawing showing an arrangement of the wavelength conversion laser of embodiment 1 to 8 according to the present invention.

FIG. 1 is a schematic view that shows the construction of Embodiment 1 of the present invention. In FIG. 1, reference numeral 1 is a laser resonator mirror having a high reflectivity with respect to a fundamental laser beam, 2 is a polarizer such as a Brewster plate for controlling the polarization of the fundamental laser beam inside the resonator, 3 is a solid-state laser active medium, 4 is a mirror that has a high reflectivity to the fundamental laser beam and also has a high transmittance to the second harmonic laser beam, 5 is a mirror that has a high transmittance to the sum frequency laser beam and also has a high reflectivity to the second harmonic laser beam and the fundamental laser beam, 6 is a second harmonic generation wavelength conversion crystal for generating second harmonic laser beam, 7 is a sum frequency generation wavelength conversion crystal for generating sum frequency (or third harmonic) laser beam, 8 is a Q switching device serving as a resonator Q value modulating element, and 9 is a laser resonator mirror having a high reflectivity to the fundamental laser beam and the second harmonic laser beam. Moreover, 20 indicates a optical axis of laser oscillation. As illustrated in the Figure, the length $l_{2\omega}$ in the optical axis direction of the second harmonic generation wavelength conversion crystal 6 is set shorter than the length $l_{3\omega}$ in the optical axis direction of the sum frequency generation wavelength conversion crystal 7.

In the wavelength conversion laser shown in FIG. 1, a linearly polarized fundamental pulse laser beam is generated by the laser resonator mirrors 1 and 9 constituting a laser resonator, mirrors 4 and 5 serving as folding mirrors with respect to the fundamental beam, the solid-state laser active medium 3, the polarizer 2 and the Q switching device 8, and one portion of this beam is converted into a second harmonic laser beam by the second harmonic generation wavelength conversion crystal 6 placed inside the laser resonator. One portion of the second harmonic laser beam thus generated and one portion of the fundamental laser beam that has not been converted into the second harmonic laser beam are converted into a third harmonic laser beam serving as a sum frequency laser beam by the sum frequency generation wavelength conversion crystal 7 placed inside the laser resonator. The third harmonic laser beam (3ω) thus generated is extracted from the mirror 5, and the second harmonic laser beam (2ω) is extracted from the mirror 4.

Here, by the present invention, it was discovered for the first time that the arrangement in which the length $l_{2\omega}$ in the optical axis direction of the second harmonic generation wavelength conversion crystal 6 is set shorter than the length $l_{3\omega}$ in the optical axis direction of the sum frequency generation wavelength conversion crystal 7 makes it possible to reduce adverse effects caused by the angle and temperature of the second harmonic generation wavelength conversion crystal on the generation of the sum frequency laser beam, thereby providing high sum frequency generating efficiency. The following description will explain the reasons of this achievement.

Figure 2:
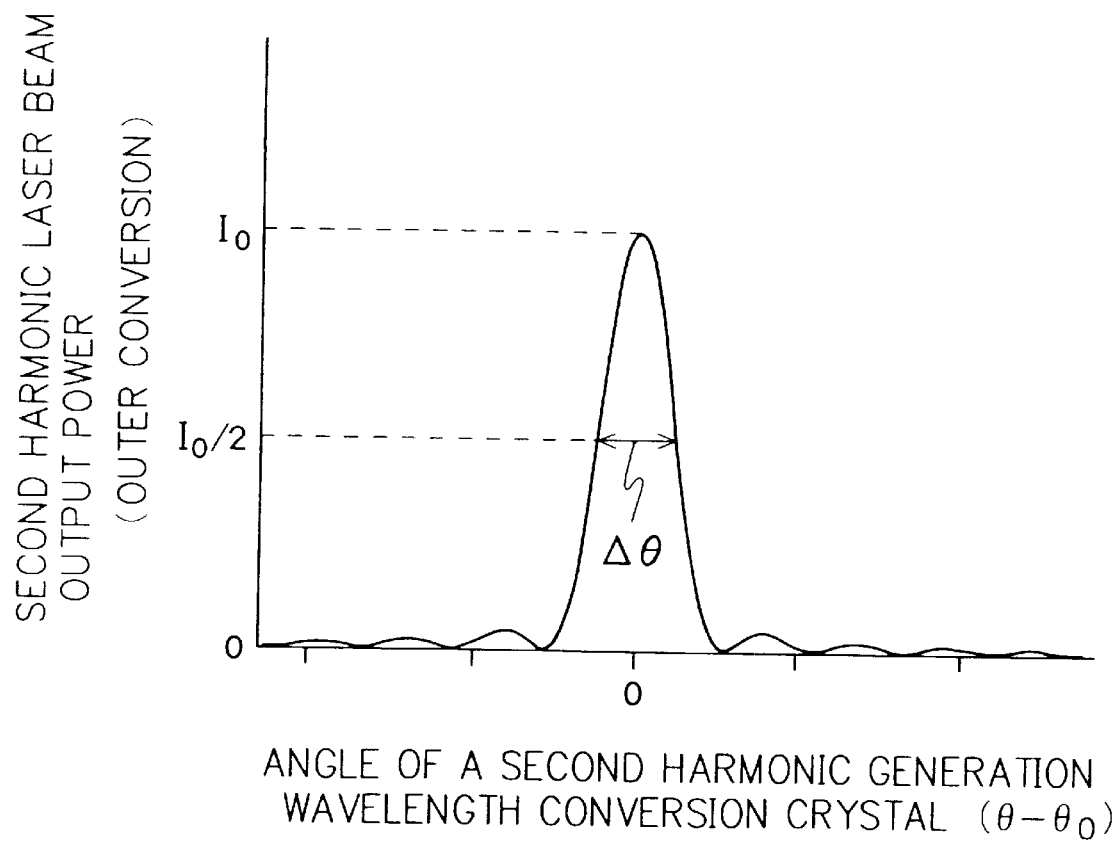
FIG. 2 is a schematic diagram showing a dependence of the second harmonic laser beam average output power on an angle of the wavelength conversion crystal in case of extracavity frequency conversion, where a frequency conversion crystal is placed outside the resonator.

In order to explain the wavelength conversion crystal angle dependence of the laser beam output power in intracavity sum frequency generation, at first an explanation about the wavelength conversion outside the resonator will be given, that is, the wavelength conversion crystal angle dependence of the laser beam output in second harmonic generation, in case where the wavelength conversion crystal is placed outside the resonator. FIG. 2 is a drawing that schematically shows the dependence of the second harmonic laser beam output power on the wavelength conversion crystal angle θ around the phase matching angle $\theta_0$, which is shown in the document "Handbook of Nonlinear Optical Crystals", (Second, Revised and Updated Edition (Springer Verlag)), etc. The wavelength conversion crystal angle on the horizontal axis is indicated by using the angle deviation $(\theta-\theta_0)$ from the phase matching angle $\theta_0$ (where the incident condition of the fundamental beam is constant). In FIG. 2, the relationships among the second harmonic laser beam output I, the amount of the phase mismatch Δk and the length l of the second harmonic generation wavelength conversion crystal is represented as follows:

$$I \ (\sin(\Delta kl/2)/(\Delta kl/2))^2 \quad (1)$$

In expression (1), the amount of phase mismatch Δk is proportional to the angle deviation $(\theta-\theta_0)$ from the phase matching angle.

$$\Delta k \ (\theta-\theta_0) \quad (2)$$

Here, the phase matching acceptance angle (Δθ) is generally used as a quantity that characterise the angle dependence of the wavelength conversion crystal. As shown in FIG. 2, Δθ represents an angle width between angles in which the second harmonic laser beam output power is half the maximum output power. Here, from the relationship between expression (1) and Δθ, $(\theta-\theta_0)=\Delta\theta$, when $\Delta kl=0.886\pi$. Δθ is an inherent value for the wavelength conversion crystal and its phase matching method.

With respect to specific examples of numeric values reported by "Handbook of Nonlinear Optical Crystals", (Second, Revised and Updated Edition (Springer Verlag)), in case of LBO($LiB_3O_5$) type 1 angle phase matching second harmonics generation, ΔΓ=0.34 (degree×cm), and in case of KTP($KTiOPO_4$) type 2 angle phase matching second harmonics generation, Δθ=0.53 (degree×cm).

As the angle of the wavelength conversion crystal is varied, a peak appears when $\Delta kl/2=0, \pm(2n+1)\pi/2$ (n =1, 2, 3 . . . ) therefore, the longer the length l of the wavelength conversion crystal, the narrower the intervals of the second harmonic output peaks as well as the width of the individual peaks shown in FIG. 2, with the result that the number of the second harmonic output power peaks, which appears in case where the second harmonic wavelength conversion crystal is shifted within a given angle range, increases as the length of the wavelength conversion crystal is lengthened.

Here, in case when the second harmonic wavelength conversion crystal is placed outside the fundamental laser resonator so as to carry out second harmonics generation, that is, in case of the extracavity wavelength conversion, the second harmonics output at the phase matching angle $\theta_0$ (Δkl=0 in expression (1)) is sufficiently greater than the second harmonics output at the other peaks ($\Delta kl/2=\pm(2n+1)\pi/2$ (n=1, 2, 3 . . . )) in expression (1)) as shown in FIG. 2; therefore, the alignment is easily carried out without causing any difficulty in practical application.

Figure 3:
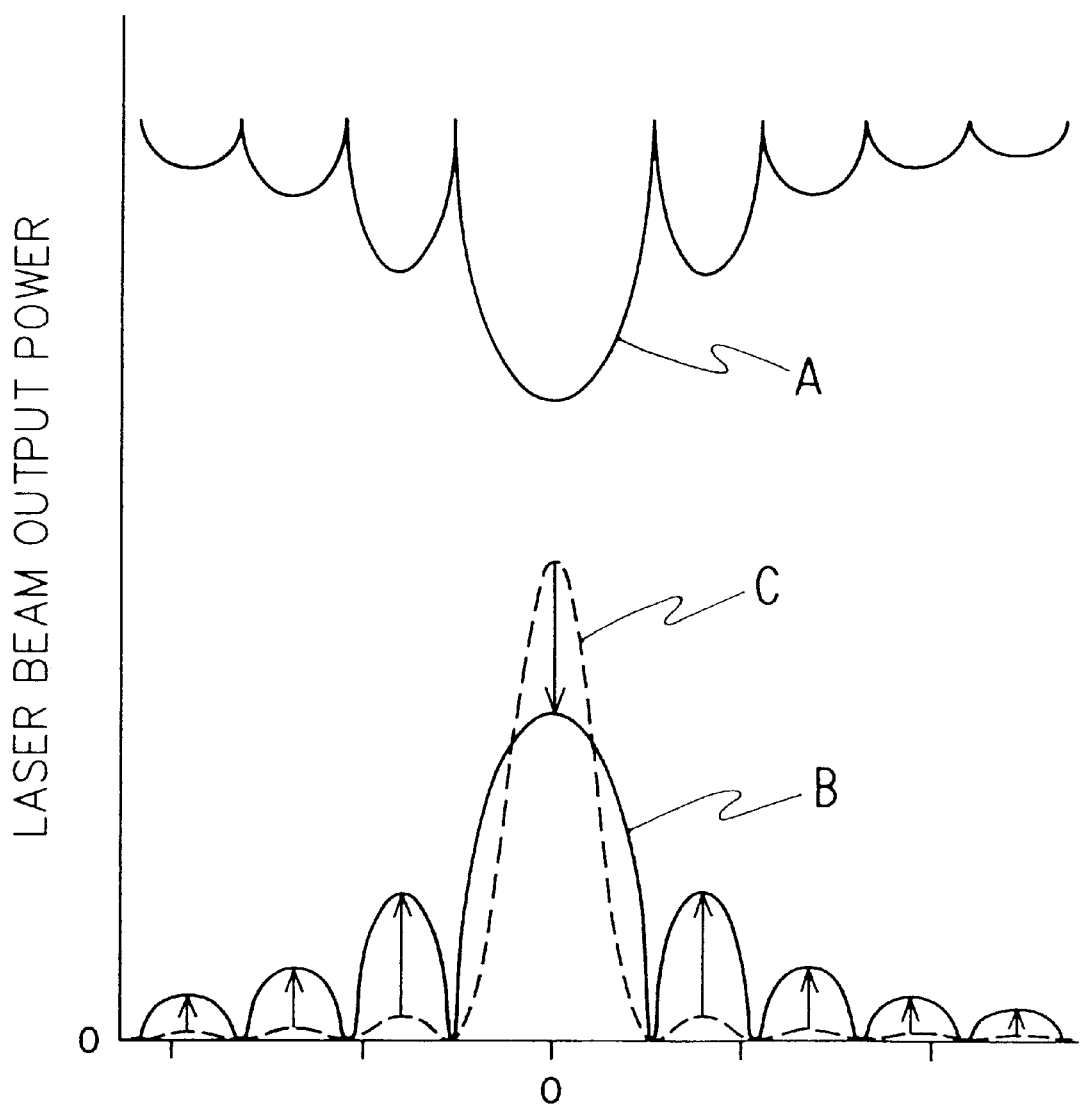
FIG. 3 is a schematic diagram showing a crystal angle dependence of the second harmonic laser beam output power in case of intracavity frequency conversion, where a frequency conversion crystal is placed in the resonator.

Based upon the above explanation, an explanation will be given of a case in which the second harmonic generation wavelength conversion crystal is placed inside the laser resonator so as to carry out the wavelength conversion, that is, the case of intracavity wavelength conversion. FIG. 3 schematically shows wave length conversion crystal angle dependence of the second harmonic laser beam output power (line B) and the intracavity fundamental laser beam power (line A) in case when the second harmonics generation is carried out by placing only the second harmonic generation wavelength conversion crystal inside the laser resonator as a wavelength conversion crystal. For comparison, a dashed line (c) indicates a schematic graph that shows the angle dependence obtained when the same wavelength conversion crystal is used for carrying out the extracavity wavelength conversion. Arrows between lines B and C indicate the change of second harmonic laser beam output power from extracavity conversion case to intracavity conversion case.

The following description will discuss the reasons for the characteristics shown in FIG. 3. In case when the second harmonic generation wavelength conversion crystal is placed inside the laser resonator so that the second harmonic generation is carried out by constructing the laser resonator using only the mirrors having a high reflectivity to the fundamental laser beam, a portion of the fundamental beam power in the resonator that has been converted to the second harmonic beam is extracted from the resonator as an output. For this reason, increasing the conversion efficiency to the second harmonic beam is actually the same as increasing the output coupling rate of the fundamental beam, and in contrast, reducing the conversion efficiency is actually the same as decreasing the output coupling rate. Therefore, as the conversion efficiency to the second harmonic beam increases, the fundamental beam power inside the resonator decreases, while as the conversion efficiency to the second harmonic beam reduces, the fundamental beam power inside the resonator increases. When the second harmonic generation wavelength conversion crystal angle is varied, the fundamental power inside the resonator reduces at an angle (for example, phase matching angle $\theta_0$) having a high wavelength conversion efficiency and, in contrast, the fundamental power inside the resonator increases at an angle having a low wavelength conversion efficiency, as shown in FIG. 3. Here, the second harmonic beam output power is given by a product between (the wavelength conversion efficiency) and (the intracavity fundamental beam power); therefore, as compared with the external wavelength conversion indicated by the dotted line, in the intracavity wavelength conversion, the difference between the second harmonic laser beam output power at an angle having a higher wavelength conversion efficiency and the second harmonic laser beam output power at an angle having a lower wavelength conversion efficiency becomes smaller, with the result that, as shown in FIG. 3, the difference between the second harmonic output power peaks at angles other than the phase matching angle $\theta_0$ ($\Delta kl/2=\pm(2n+1)\pi/2$ (n=1, 2, 3 . . . )) in expression (1)) and that at the phase matching angle $\theta_0$ ($\Delta kl/2=0$ in expression (1)) becomes smaller. As a result, as shown in FIG. 3, a plurality of peaks, which do not have great differences in their outputs, appear in the angle dependence of the second harmonic output on the second harmonic generation wavelength conversion crystal angle as shown in FIG. 3, resulting in difficulties in finding the angle at which the maximum second harmonic output is obtained, by varying angles. In the past, no detailed observations were carried out on the complicated wavelength conversion crystal angle dependence of the second harmonic laser beam output caused by these variations in the intracavity beam power.

Moreover, the variation of the fundamental beam power inside the resonator at the time of the intracavity wavelength conversion, which depends on the angle of second harmonic generation wavelength conversion crystal as described above, becomes more conspicuous when a resonator Q vale modulating element is placed inside the resonator so as to carry out a Q switch oscillation, because of its higher wavelength conversion efficiency. In this case, the second harmonic output characteristic that depends on the wavelength conversion crystal angle as described above becomes more complex.

Figure 4:
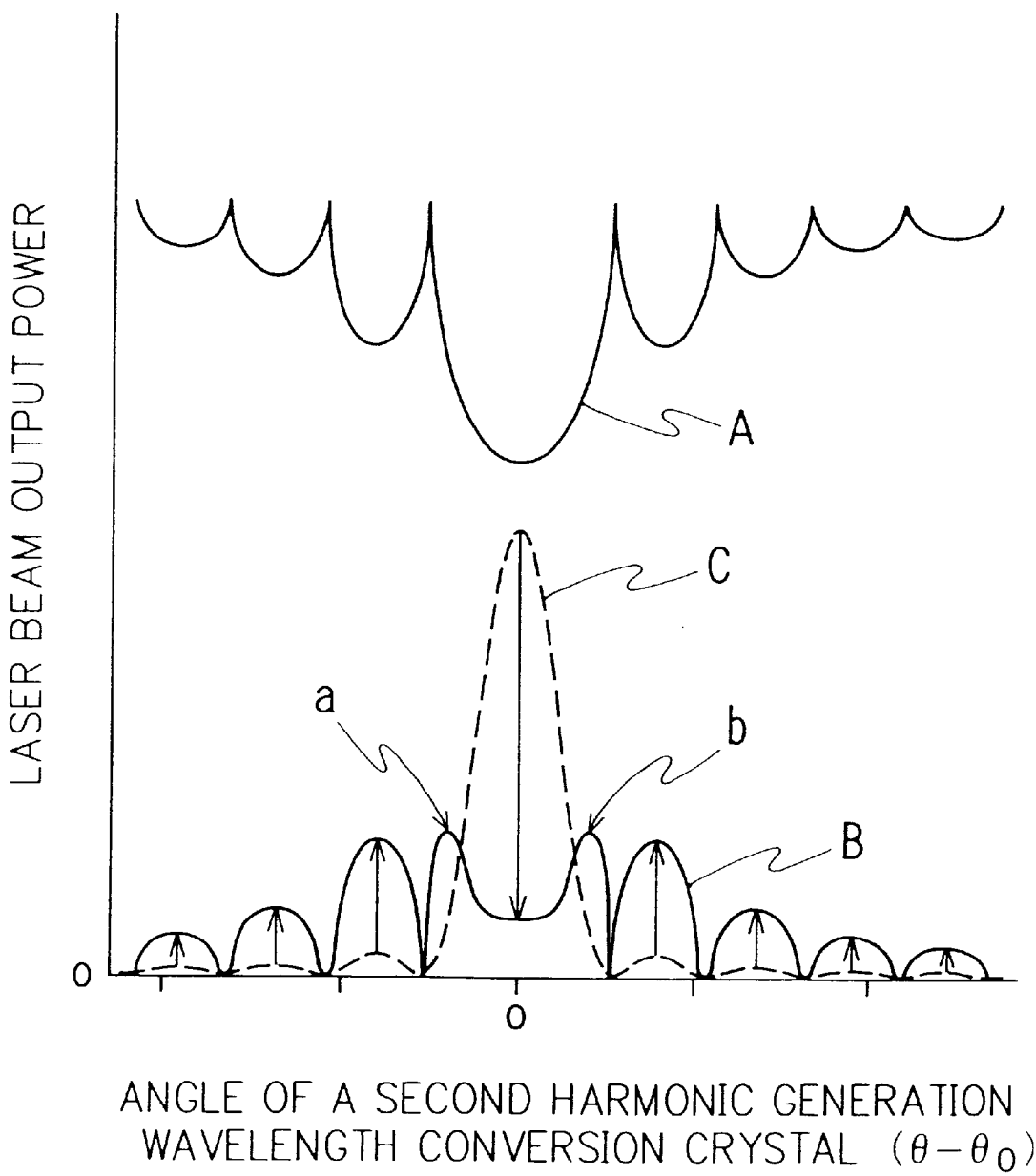
FIG. 4 is a schematic diagram showing a crystal angle dependence of the sum frequency laser beam average output power generated by using second harmonic generation wavelength conversion crystal and sum frequency generation wavelength conversion crystal placed in the laser resonator.

An explanation will be given on the dependence of the sum frequency laser beam output on the angle of second harmonic generation wavelength conversion crystal in case of a sum frequency generation carried out by an arrangement in which, in the construction for the second harmonic generation by the intracavity wavelength conversion having the above-mentioned characteristic, a sum frequency generation wavelength conversion crystal is further added to the inside of the laser resonator so as to carry out a sum frequency generation. FIG. 4 schematically shows the variation of the sum frequency laser beam output (line B) and the fundamental laser beam power in the resonator (line A) in case when the angle of the second harmonic generation wavelength conversion crystal is varied. For comparison, dashed line (c) indicates the second harmonic laser beam power in extracavity conversion case. Since the second harmonic laser beam output is proportional to (the fundamental laser beam intensity at the wavelength conversion crystal position)$^2$, and since the sum frequency laser beam output is proportional to (the second harmonic laser beam intensity at the wavelength conversion crystal position)×(the fundamental laser beam intensity at the wavelength conversion crystal position), the sum frequency laser beam output is more likely to be affected by the intracavity fundamental laser beam power variation, as compared with the second harmonics output indicated by dashed lines in FIG. 3 and FIG. 4. As a result, as shown in FIG. 4, the difference between the sum frequency laser beam output in case the second harmonic wavelength conversion crystal angle is located at the phase matching angle $\theta_0$ ($\Delta kl/2=0$ in expression (1)) and that in case it is located at a peak on the periphery thereof ($\Delta kl/2=\pm(2n+1)\pi/2$ (n=1, 2, 3 . . . )) in expression (1)) becomes further smaller than the case of the second harmonic generation. As a result, as compared with the second harmonic output characteristic shown in FIG. 3, the number of peaks having similar outputs further increases, resulting in difficulties in finding the angle at which the maximum sum frequency output is obtained, by varying angles.

Moreover, in case when the length of second harmonic generation wavelength conversion crystal is set longer than a predetermined length, as shown in FIG. 4, the second harmonic laser beam intensity at the sum frequency generation wavelength conversion crystal position becomes higher at the phase matching angle $\theta_0$ and the periphery thereof where the second harmonic laser beam output is highest, while the fundamental laser beam intensity is lowered, with the result that, as shown by portions a and b in FIG. 4, the maximum sum frequency laser beam output is sometimes obtained at a position deviated from the phase matching angle $\theta_0$ where the maximum value of the second harmonic output is obtained. In this case, there are more peaks at which similar sum frequency laser beam outputs are obtained. With respect to the assembling sequence for a wavelength conversion laser, first, one of the mirrors constituting a laser resonator is set as a partially transmitting mirror for the fundamental beam, and while taking one portion of the fundamental laser beam out of the resonator, the arrangement of optical elements such as laser resonator mirrors is optimized with respect to the fundamental output. Thereafter, the partially transmitting mirror is exchanged for a total reflection mirror, and a second harmonic generation wavelength conversion crystal is inserted into the laser resonator so that the optical elements and the wavelength conversion crystal angle are optimized with respect to the second harmonic laser beam output. Then, a sum frequency generation wavelength conversion crystal is inserted into the laser resonator so that the wavelength conversion crystals and, the optical elements are aligned so as to carry out a sum frequency generation output. Here, since the optimal angles of the optical elements and the wavelength conversion crystals are changed by the insertion of the sum frequency generation wavelength conversion crystal into the laser resonator, and since the second harmonic generation wavelength conversion crystal angle that is optimal for the second harmonic generation is not necessarily coincident with an optimal angle for a stable, high output sum frequency generation, there are many cases in which the second harmonic generation wavelength conversion crystal and the optical elements constituting the laser resonator have to be re-aligned. Consequently, it is necessary to carry out an alignment process for finding an optimal angle by changing the angle of the second harmonic generation wavelength conversion crystal while the sum frequency laser beam is being generated. Thus, the existence of many peaks of the sum frequency laser beam output having similar sizes with respect to the second harmonic generation wavelength conversion crystal angle causes major obstacles in constituting a stable wavelength conversion laser with high reproducibility.

Moreover, when an attempt is made to maximize the sum frequency laser beam output in the intracavity wavelength conversion sum frequency laser beam generation device, the conversion efficiency from the fundamental beam to the second harmonic beam has an optimal value, that is, it is not the case the higher the better. In other words, when the conversion efficiency to the second harmonic beam is too high, the fundamental beam decreases, resulting in a reduction in the sum frequency beam output power. In contrast, with respect to the conversion efficiency from the fundamental beam and the second harmonic beam to the sum frequency beam, the higher it becomes, the greater the sum frequency laser beam generated. In this manner, in order to suppress the wavelength conversion efficiency to the second harmonic beam and to increase the conversion efficiency to the sum frequency beam, the length of the sum frequency generation wavelength conversion crystal is set longer, that is, the second harmonic generation wavelength conversion crystal is set shorter than the sum frequency generation wavelength conversion crystal; thus, by increasing the sum frequency generation efficiency, it is possible to construct a stable wavelength conversion laser with high reproducibility. This fact is first disclosed by the present invention.

Figure 5:
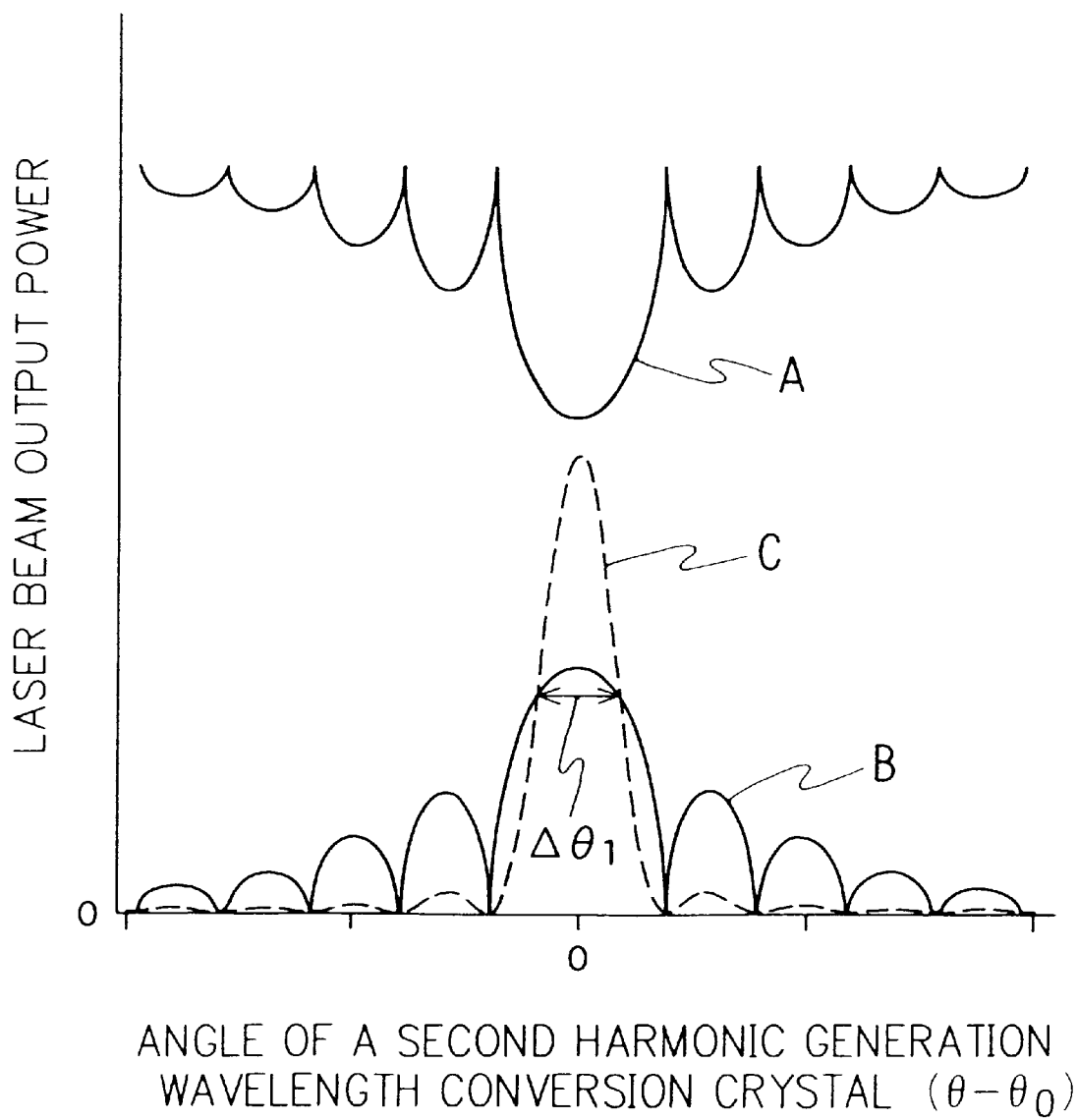
FIG. 5 is a schematic diagram showing a crystal angle dependence of the second harmonic laser beam average output power in case using a long second harmonic generation frequency conversion crystal.
Figure 6:
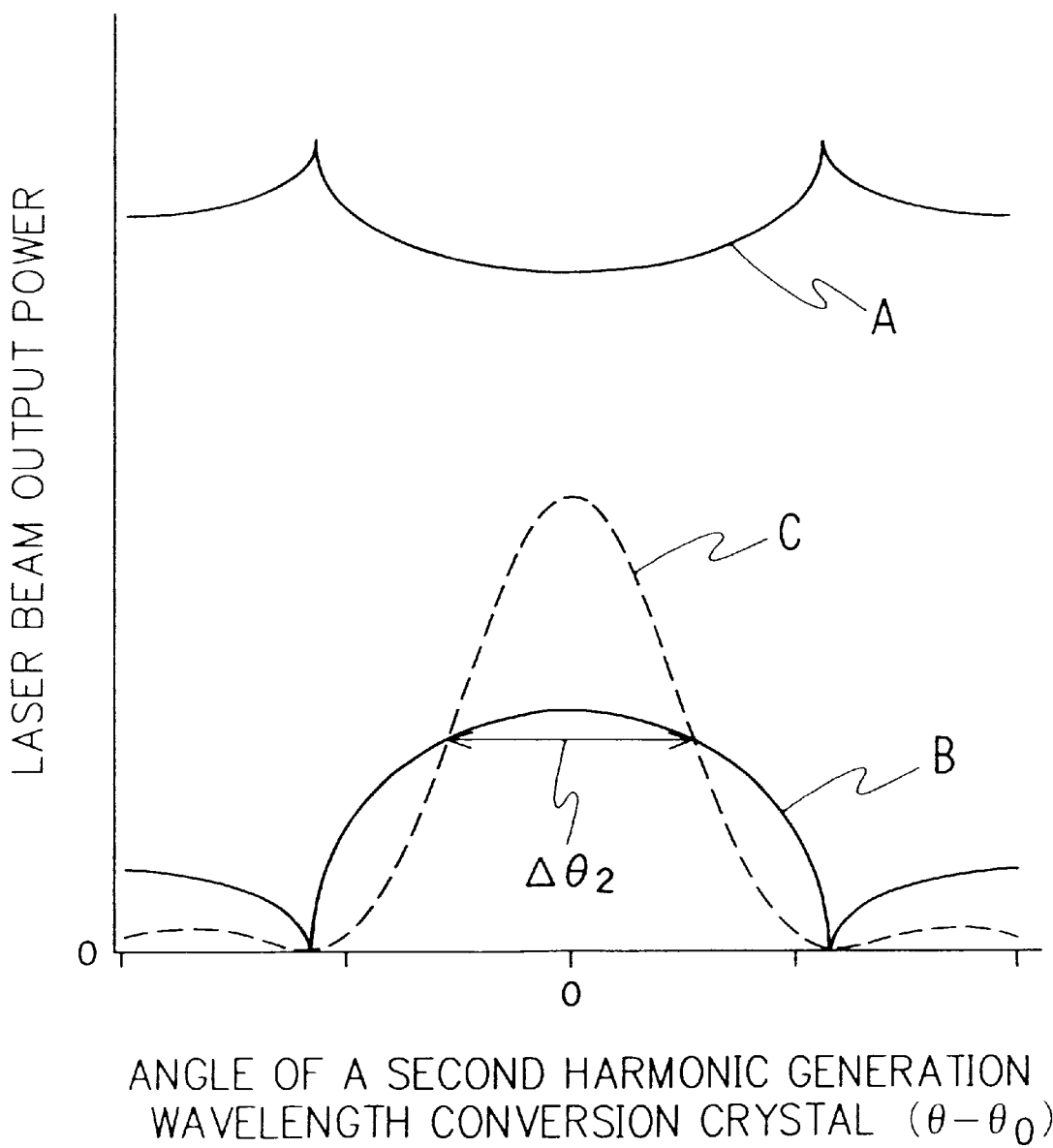
FIG. 6 is a schematic diagram showing a crystal angle dependence of the second harmonic laser beam power in case using a short second harmonic generation frequency conversion crystal.

The following description will discuss how the angle dependence of the sum frequency output on the second harmonic generation wavelength conversion crystal changes depending on the length of the second harmonic generation wavelength conversion crystal. First, FIG. 5 and FIG. 6 schematically show the dependence of the intracavity fundamental laser beam power (line A) and the second harmonic laser beam power (line B) on the angle of second harmonic generation wavelength conversion crystal in respective cases when the second harmonic generation wave conversion crystal has a longer length and when it has a shorter length, under the condition that the sum frequency generation wavelength conversion crystal is not inserted. Dashed line (c) indicates the second harmonic laser beam power in case of extracavity conversion.

Comparison between FIG. 5 and FIG. 6 shows that, for the same reasons as explained in FIGS. 2 and 3, as compared with FIG. 5, in case of the shorter length of the second harmonic generation wavelength conversion crystal shown in FIG. 6, since the angle width and angle intervals between the peaks (and dips) of the second harmonic laser beam output (and the fundamental laser beam power) are widened, the second harmonic laser beam output that depends on the wavelength conversion crystal angle gradually changes, and the number of peaks reduces. Therefore, by using the shorter second harmonic generation wavelength conversion crystal, the wavelength conversion laser beam output that depends on the angle of the second harmonic generation wavelength conversion crystal can be simplified, and it is possible to obtain a laser device which can be easily adjusted.

Figure 7:
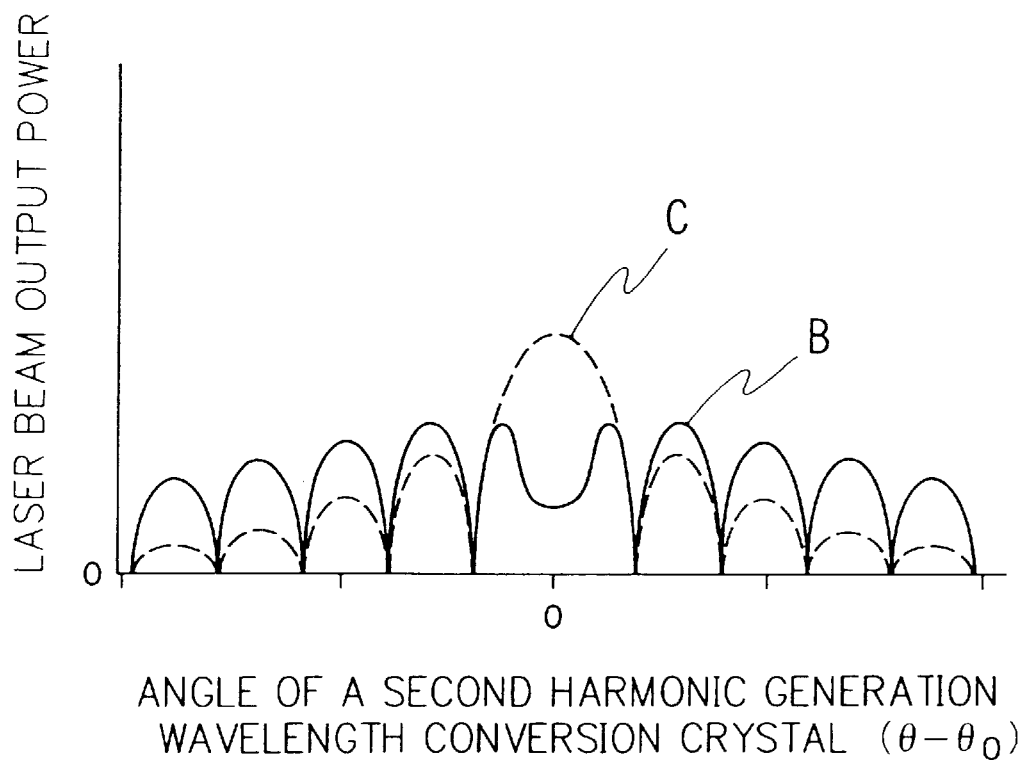
FIG. 7 is a schematic diagram showing a crystal angle dependence of the sum frequency laser beam average output power in case using a long second harmonic generation wavelength conversion crystal.
Figure 8:
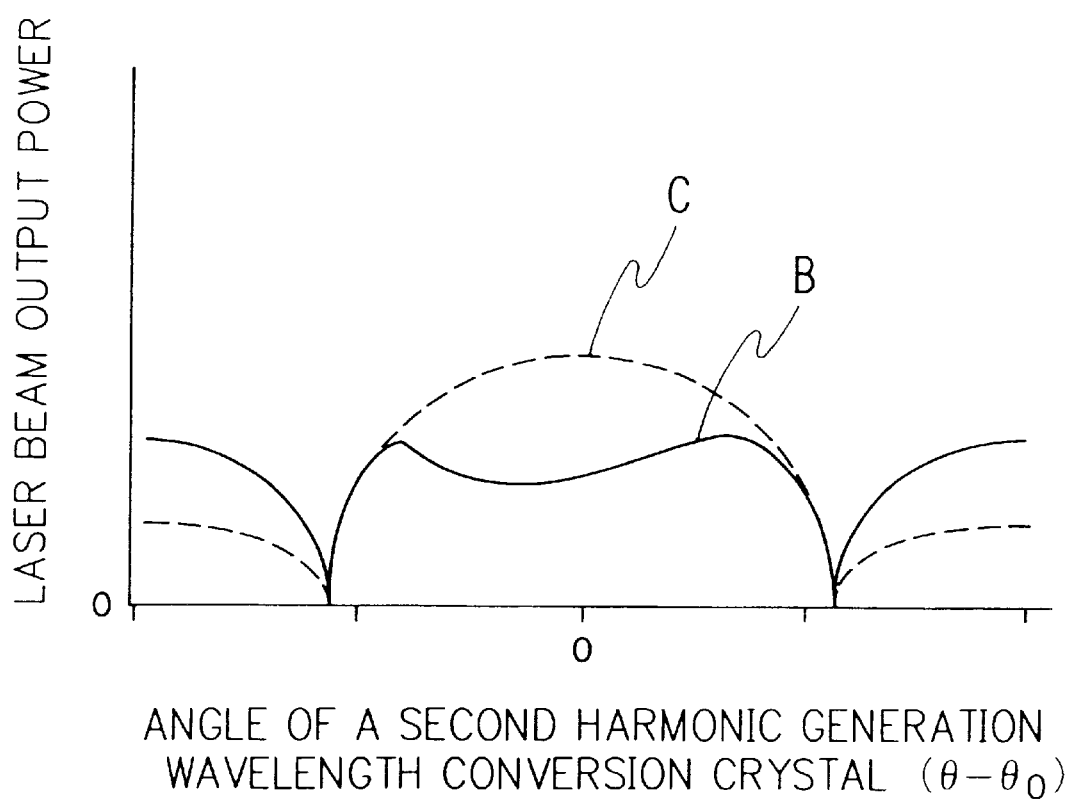
FIG. 8 is a schematic diagram showing a crystal angle dependence of the sum frequency laser beam average output power in case using a short second harmonic generation wavelength conversion crystal.

Moreover, FIG. 7 and FIG. 8 schematically show the angle dependence of the sum frequency output power (line B) on the second harmonic generation wavelength conversion crystal in respective cases when the second harmonic generation wavelength conversion crystal has a longer length and when it has a shorter length, under the condition that the sum frequency generation wavelength conversion crystal is placed inside the resonator so as to generate a sum frequency laser beam. For comparison, dashed line (c) indicates the second harmonic laser beam power. Comparison between FIG. 7 and FIG. 8 shows that, in the same manner as the second harmonic generation inside the resonator as explained above, in case of the shorter length of the second harmonic generation wavelength conversion crystal shown in FIG. 8, the peak (dip) angle width and peak (dip) intervals of the second harmonic laser beam intensity (and the intracavity fundamental laser beam power) are widened, and the number of peaks reduces. Therefore, it is possible to provide a laser device which has a simpler angle dependence on the second harmonic generation wavelength conversion crystal and can be easily handled. With respect to specific numeric values, for example, in case when a type one phase matching LBO ($LiB_3O_5$) crystal is used, it is expected from expression (1) that in case of a crystal having a length of 15 mm, a peak appears approximately for every 8 mrad, while in case of a crystal having a length of 5 mm, a peak appears approximately for every 24 mrad which is wider in angle; and the actual measurements were virtually coincident with these peak intervals.

Moreover, as explained in FIG. 4, in case of the application of the longer second harmonic generation wavelength conversion crystal, at the phase matching angle $\theta_0$ and the periphery thereof where the second harmonic laser beam output power of the second harmonic generation wavelength conversion crystal becomes the highest, since the wavelength conversion efficiency from the fundamental laser beam to the second harmonic laser beam is too high, the fundamental power inside the resonator is lowered, with the result that as shown in FIG. 7, the other peaks appear in the sum frequency laser beam output characteristic that depends on the second harmonic generation wavelength conversion crystal angle. In contrast, as shown in FIG. 8, by using the short second harmonic generation wavelength conversion crystal, the wavelength conversion efficiency from the fundamental laser beam to the second harmonic laser beam is lowered at the phase matching angle $\theta_0$ and the periphery thereof so that the intensity of the fundamental laser beam is increased; thus, it is possible to construct a laser device which can obtain the highest sum frequency laser beam output at the phase matching angle $\theta_0$ and the periphery thereof where the second harmonic laser beam output becomes highest.

Figure 9:
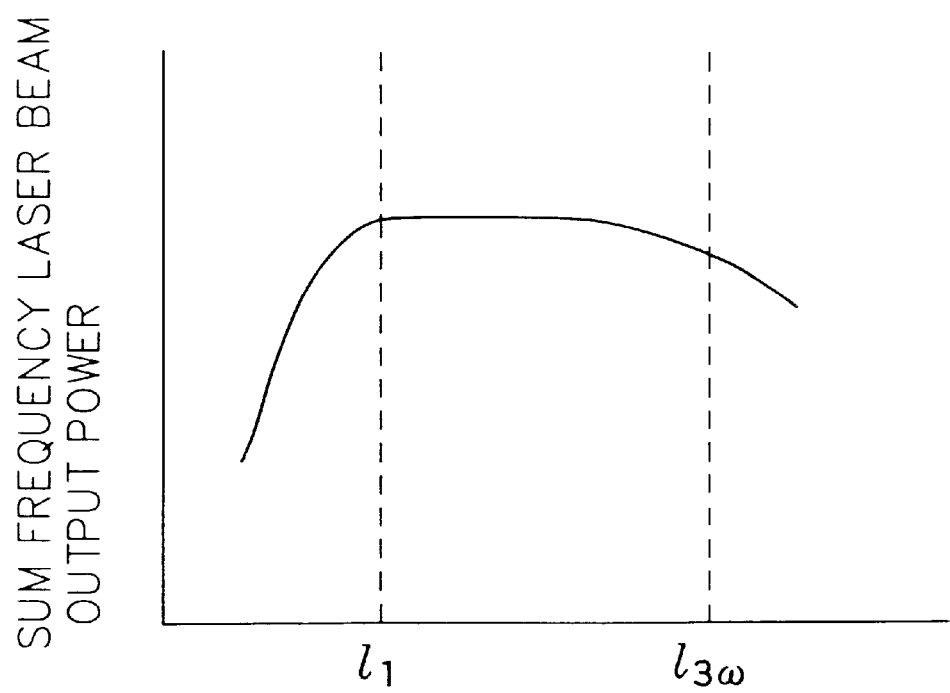
FIG. 9 is a schematic diagram showing a change in sum frequency laser beam power in accordance with the length of second harmonic generation wavelength conversion crystal.

The following description will discuss how the resulting sum frequency laser beam output varies depending on the length of the second harmonic generation wavelength conversion crystal. FIG. 9 schematically shows the change in the sum frequency laser beam output when the length of the second harmonic generation wavelength conversion crystal is varied, while the length $l_{3\omega}$ of the sum frequency generation wavelength conversion crystal is maintained constant in the construction for the intracavity wavelength conversion sum frequency generation as shown in FIG. 1. As shown in FIG. 9, with respect to the second harmonic generation wavelength conversion crystal, when the sum frequency output is monitored while the length of the second harmonic generation wavelength conversion crystal is varied, a peak (a point having a length $l_1$ in FIG. 9), where the maximum output of sum frequency laser beam is obtained exists. And when the length of the second harmonic generation wavelength conversion crystal is set to a length not less than $l_1$, the sum frequency output slightly reduces in most cases, and at least the output does not increase greatly. The main reasons are explained as follows:

(1) The effects that act so as to reduce the fundamental intracavity power become greater than those effects that increase the second harmonics output power.

(2) The pulse width becomes longer due to an increase in the wavelength conversion efficiency of the second harmonic generation wavelength conversion crystal. In this case, as described earlier, of course, as the length of the second harmonic generation wavelength conversion crystal becomes longer, a number of peaks appear in the sum frequency laser beam output depending on the angle of second harmonic generation wavelength conversion crystal, causing a problem of difficulties in adjustments.

With respect to the characteristic shown in FIG. 9, specific numeric values experimentally obtained are given. In the same construction as FIG. 1, a third harmonic generating LBO crystal having a length $l_{3\omega}$ of 10 mm was used as the sum frequency generation wavelength conversion crystal, and the length of second harmonic generation wavelength conversion crystal was varied in a laser device having a repeating frequency of several kHz and a sum frequency beam output of approximately 5 to 10 W; consequently, the resulting $l_1$ which gives the maximum sum frequency beam power was virtually 3 mm. Moreover, in case of the length of not less than 10 mm ($l_{3\omega}$) of the second harmonic generation wavelength conversion crystal, even if the second harmonic generation wavelength conversion crystal was lengthened as shown in FIG. 9, the output was not improved and the characteristic showed a slight reduction. Here, it was experimentally confirmed that the second harmonic generation wavelength conversion crystal angle dependence appeared as shown in FIG. 7, making the adjustment extremely complex. As described above, it has been experimentally confirmed that, by shortening the length of the second harmonic generation wavelength conversion crystal as compared with the length of the sum frequency generation wavelength conversion crystal, it becomes possible to obtain the sum frequency output power sufficiently and also to make the adjustment easier.

Moreover, when the second harmonic generation wavelength conversion crystal is set shorter, the wavelength conversion efficiency from the fundamental laser beam to the second harmonic laser beam is lowered, with the result that the pulse width is shortened and the peak intensities of the fundamental wave and the second harmonic become higher (for example, shown by Journal of Applied Physics vol. 41, p609 (Pulse Lengthening via Overcoupled Internal Second-Harmonic Generation)). Since the sum frequency generation efficiency is proportional to the intensities of the incident fundamental beam and the second harmonic beam, it is possible to arrange the laser device so as to enhance the wavelength conversion efficiency from the fundamental beam and the second harmonic beam to the sum frequency beam.

Moreover, the greater the wavelength conversion crystal, the more difficult it becomes to make a uniform crystal, and as the length becomes longer, the price of the crystal increases. Therefore, the application of a shorter second harmonic generation wavelength conversion crystal makes it possible to reduce the cost and consequently to construct a wavelength conversion laser having a desired performance at low cost. Here, with respect to the lower limit of the length, it is set approximately not less than 0.5 mm, when the limitation in manufacturing the wavelength conversion crystal and the reduction in the wavelength conversion efficiency are taken into consideration.

Moreover, with respect to the position of insertion of the wavelength conversion crystal, in the wavelength conversion laser as shown in FIG. 1, the arrangement is made so that the sum frequency generation wavelength conversion crystal 7 is located at a position between the solid-state laser active medium 3 and the second harmonic generation wavelength conversion crystal 6; thus, since the sum frequency output power is extracted from the mirror 5 in this arrangement, the case in which the fundamental beam and the second harmonic beam simultaneously pass through the sum frequency generation wavelength conversion crystal 7 is limited to only once when the fundamental wave and the second harmonics are reflected by the mirror 9 and returned; this minimizes the adverse effects given by the wavelength conversion crystal temperature change and angle change on the sum frequency generation efficiency, thereby making it possible to achieve a stable device. In contrast, in case when the positions of the second harmonic generation wavelength conversion crystal and the sum frequency generation wavelength conversion crystal are reversed, that is, in case when the second harmonic generation wavelength conversion crystal is located between the sum frequency generation wavelength conversion crystal and the solid-state laser active medium, the case in which the fundamental beam and the second harmonic beam simultaneously pass through the sum frequency generation wavelength conversion crystal increases to twice when they are made incident thereon from the second harmonic generation wavelength conversion crystal and when they are reflected by the mirror 9, with the result that the adverse effects given by the wavelength conversion crystal temperature and angle on the sum frequency generation efficiency become greater, and makes the laser device unstable. Actually, in the construction shown in FIG. 1, by using a Q pulse wavelength conversion laser having a sum frequency output power of 5 to 10 W and a pulse width of ~100 ns, with a LBO crystal having a length of 10 mm being used as the sum frequency (third harmonics) wavelength conversion crystal and with a LBO crystal having a length of 5 mm being used as the second harmonic generation wavelength conversion crystal, changes in the wavelength conversion laser beam output power and the intracavity fundamental laser beam output power were observed while changing the temperature of the sum frequency generation wavelength conversion crystal. The results showed that the temperature range which allows the sum frequency output to become 95% of the maximum output (a temperature difference between two temperatures allowing the output to become 95% of the maximum output at an upper level and a lower level in temperatures) was approximately 1 to 2 degrees; while in case when the positions of the wavelength conversion crystals were reversed, the temperature range became not more than 0.3 degrees so that it was confirmed that the construction of FIG. 1 is superior.

Embodiment 2

A means for finely adjusting the angle with precision not more than ±0.1 degree may be added to the second harmonic generation wavelength conversion crystal or the sum frequency generation wavelength conversion crystal shown in FIG. 1. In general, the wavelength conversion crystal of the angle tuning phase matching type (which is a wavelength conversion crystal that is phase matched by finely adjusting mainly the angle of the wavelength conversion crystal, and which has a great change in its phase matching conditions depending on the wavelength conversion crystal angle) requires fine adjustments to the wavelength conversion crystal angle more frequently in handling the device; therefore, the complex angle dependence of the sum frequency output on the wavelength conversion crystal, as explained by reference to FIGS. 2 to 8, greatly affects the operation of the wavelength conversion device. Therefore, the effects obtained by shortening the second harmonic generation wavelength conversion crystal as compared with the sum frequency generation wavelength conversion crystal is greater when a wavelength conversion crystal of the angle phase matching type is used. In the wavelength conversion laser having the mechanism for carrying out fine adjustments with an angle precision of not more than ±0.1 degree like the present embodiment, by setting the second harmonic generation wavelength conversion crystal shorter than the sum frequency generation wavelength conversion crystal, it also becomes possible to provide a stable laser device which is easily handled with high reproducibility.

Embodiment 3

A means for finely adjusting the temperature with precision not more than ±0.5 degrees (centigrade) may be added to the second harmonic generation wavelength conversion crystal or the sum frequency generation wavelength conversion crystal shown in FIG. 1. Some of the wavelength conversion crystals have a narrow temperature tolerance, and for example, when the third harmonic generating type 2 phase matching LBO crystal is used as the sum frequency generation wavelength conversion crystal, the temperature tolerance (which is a temperature range between two temperatures at which, with a crystal having a length of 1 cm, the conversion efficiency drops to half as compared with the conversion efficiency at the phase matching temperature) shows 3.7 degrees (as reported by, for example, "Handbook of Nonlinear Optical Crystals", (Second, Revised and Updated Edition (Springer Verlag), etc.). In case when a wavelength conversion crystal with such a comparatively narrow temperature tolerance is used, it is sometimes necessary to control the temperature of the wavelength conversion crystal, in order to construct a laser device which can suppress the output power variations to a range that raises no problem in practical use, which can also avoid damages to the wavelength conversion crystal due to an increase in the inner resonator fundamental laser beam power caused by degradation in phase matching conditions due to a rapid temperature change in the wavelength conversion crystal, and which can be operated stably for a long time. In the present embodiment, in the wavelength conversion laser provided with the mechanism for controlling the temperature of the wavelength conversion crystal with precision not more than ±0.5 degrees, the second harmonic generation wavelength conversion crystal is set shorter than the sum frequency generation wavelength conversion crystal so that it becomes possible to provide a stable laser device with high reproducibility that can be easily handled.

Embodiment 4

With respect to the solid-state laser active medium for the wavelength conversion laser as shown in FIG. 1, Nd:YAG can be adopted. Nd:YAG is a laser material which is superior in chemical stability and mechanical strength and which has a comparatively high thermal conductivity and a high thermal fracture limit. Moreover, as compared with other solid-state laser active mediums, this material provides optically high-quality crystals at low costs. The application of Nd:YAG as the solid-state laser active medium makes it possible to construct a stable laser device with high reproducibility and scalability that can be easily handled, at low costs.

Embodiment 5

With respect to the solid-state laser active medium for the wavelength conversion laser as shown in FIG. 1, Nd:YLF can be adopted. Nd:YLF has a small thermal lensing effect. In general, when a laser device is constructed by using a solid-state laser active medium, the laser output sometimes becomes unstable due to variations in the thermal lens focal length of the solid-state laser active medium. Moreover, when the Q pulse oscillation is carried out, the pulse-to-pulse stability is sometimes lowered. The application of Nd:YLF with such a small thermal lensing effect as the solid-state laser active medium makes it possible to construct a stable laser device which has a wide output range for stable operation, with ease in handling. Moreover, in case when the sum frequency generation is carried out by means of Q pulse oscillation, it is possible to construct a device that is superior in pulse-to-pulse stability.

Embodiment 6

Nd:YVO$_4$ can be used as the solid-state laser active medium for the wavelength conversion laser as shown in FIG. 1. Nd:YVO$_4$ has a wide wavelength absorption width to pumping light and a larger stimulated emission cross section. The application of Nd:YVO$_4$ as the solid-state laser active medium makes it possible to provide high tolerance with respect to variations in the wavelength of the pumping light source. Moreover, because of the wide wavelength absorption width and the stimulated emission cross section, it provides a high fundamental beam generation efficiency. Moreover, in case when a Q pulse laser is constructed, since the stimulated emission cross section is large, it is possible to generate a wavelength conversion laser beam with a shorter pulse width even when the Q switching operation is carried out by using a high repetition rate. Furthermore, since the pulse width is short, it is possible to increase the wavelength conversion efficiency. The application of Nd:YVO$_4$ having the above-mentioned characteristics makes it possible to provide a wavelength conversion laser that can be handled more easily.

Embodiment 7

LBO(LiB$_3$O$_5$) can be used as the second harmonic generation wavelength conversion crystal or the sum frequency generation wavelength conversion crystal for the wavelength conversion laser as shown in FIG. 1. As compared with other crystals, LBO crystal has a higher damage threshold value; therefore, it can generate a wavelength conversion laser beam with a high output and a high peak pulse. Moreover, as compared with other second harmonic generation wavelength conversion crystals such as KTP crystals, it has smaller variations in the refractive index that depend on temperatures and a higher thermal conductivity; therefore, it is less susceptible to effects due to heat generation. Furthermore, as compared with β-BBO crystals currently used for the third harmonics generation, since this material has a wider phase matching angle tolerance, it is possible to generate a sum frequency laser beam with a higher circular ratio (defined by minimum diameter divided by maximum diameter). Moreover, because of its high thermal conductivity, it can generate a sum frequency laser beam with a high output power and high efficiency in a stable manner. By using the LBO crystal having superior characteristics as described above as the second harmonic generation wavelength conversion crystal or the sum frequency generation wavelength conversion crystal in the construction shown in FIG. 1, it is possible to construct a stable wavelength conversion laser with a high output power and high efficiency that can be easily handled.

Embodiment 8

The wavelength conversion laser of the present invention is particularly effective at a sum frequency laser beam average output of not less than 1 W. When the average output power of the wavelength conversion laser beam extracted from the sum frequency generation wavelength conversion crystal and the second harmonic generation wavelength conversion crystal becomes greater, a thermal distortion occurs in the wavelength conversion crystal, making the output power unstable as well as making the alignment of the optical elements more difficult. Moreover, since the solid-state laser active medium needs to be strongly pumped in order to increase the output power, the solid-state laser active medium is also subjected to a distortion such as thermal lens and thermal birefringence, and consequently causes the output power to become unstable and the alignment of the optical elements to become more complex. Moreover, since the average intensity of the laser beam on the optical elements increases, the optical elements are more likely to be damaged. Furthermore, the phase matching angle of the wavelength conversion crystal varies due to temperature variations. In particular, when the average output power of the sum frequency laser beam becomes approximately not less than 1 W, the above-mentioned adverse effects due to the thermal distortion of the elements remarkably appear. In such circumstances, by shortening the second harmonic generation wavelength conversion crystal, it becomes possible to simplify the characteristics that depend on the wavelength conversion crystal angle, and also to carry out the alignment with high reproducibility even under the effects of thermal distortion. Moreover, since the phase matching angle tolerance of the second harmonic generation wavelength conversion crystal is widened, the output power variation due to variations in the phase matching conditions can be minimized even if the phase matching angle varies due to temperature variations. As described above, in the wavelength conversion laser of the present invention, it becomes possible to provide a laser device which is stable and has high reliability even in high output power operations with a sum frequency output power of not less than 1 W and which can be easily handled.

Embodiment 9

Figure 10:
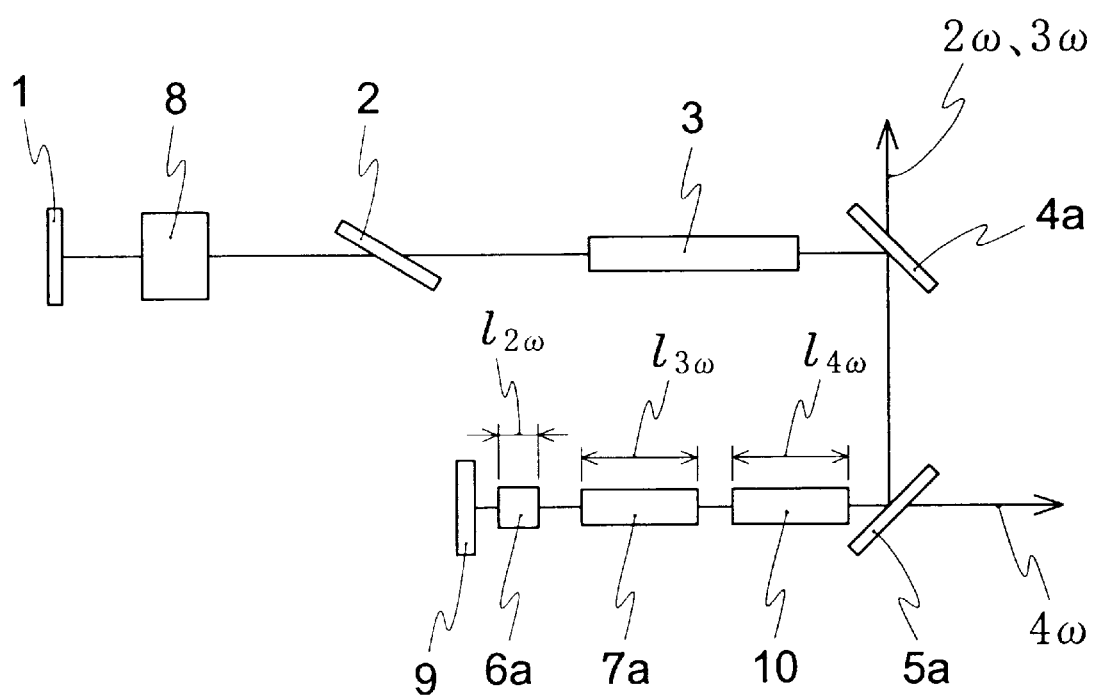
FIG. 10 is a drawing showing an arrangement of the ninth embodiment according to the present invention.

FIG. 10 is a schematic view that shows a construction of Embodiment 9 of the present invention. In FIG. 10, reference numeral 4a is a mirror that has a high reflectivity to the fundamental laser beam and also has a high transmittance to the second harmonic laser beam and third harmonic laser beam, 5a is a mirror that has a high transmittance to the fourth harmonic laser beam, and also has a high reflectivity to the third harmonic, the second harmonic and the fundamental laser beam, 6a is a second harmonic generation wavelength conversion crystal, 7a is a first sum frequency generation wavelength conversion crystal, 10 is a second sum frequency generation wavelength conversion crystal. The second harmonic generation wavelength conversion crystal 6a is shorter than the sum frequency generation wavelength conversion crystals 7a and 10.

In the wavelength conversion laser shown in FIG. 10, a linearly polarized fundamental pulse laser beam is generated by the laser resonator mirrors 1, 9 and the mirrors 4a, 5a, the solid-state laser active medium 3, the polarizing element 2 and the Q switching element 8, and one portion of this beam is converted into a second harmonic laser beam by the second harmonic generation wavelength conversion crystal 6a placed inside the laser resonator. One portion of the second harmonic laser beam thus generated and one portion of the fundamental laser beam that has not been converted into the second harmonic laser beam are converted into a third harmonic laser beam by the first sum frequency generation wavelength conversion crystal 7a placed inside the laser resonator. One portion of the third harmonic laser beam thus generated and one portion of the fundamental laser beam are converted into a fourth harmonic laser beam by the second sum frequency generation wavelength conversion crystal 10. The fourth harmonic laser beam thus generated is extracted from the mirror 5a. The third harmonic and second harmonic laser beams are taken out from the mirror 4a.

In the wavelength conversion laser shown in FIG. 10, in addition to the sum frequency generation wavelength conversion crystal 7a for generating the third harmonic laser beam from the fundamental laser beam and the second harmonic laser beam, the second sum frequency generation wavelength conversion crystal 10 for generating the fourth harmonic laser beam from the fundamental laser beam and the third harmonic laser beam is inserted into the laser resonator so that the fourth harmonic laser beam is generated. In the laser device constructed as described above, the length $l_{2\omega}$ of the second harmonic generation wavelength conversion crystal 6a is set shorter than the length $l_{3\omega}$ of the first sum frequency generation wavelength conversion crystal 7a and the length $l_{4\omega}$ of the second sum frequency generation wavelength conversion crystal 10; thus, it is possible to simplify the variation of the output of the sum frequency laser beam that depends on the second harmonic generation wavelength conversion crystal angle. Here, FIG. 10 exemplifies a case in which two sum frequency generation wavelength conversion crystals are inserted into the laser resonator; however, the number of the sum frequency generation wavelength conversion crystals are not intended to be limited to two.

Embodiment 10

Figure 11:
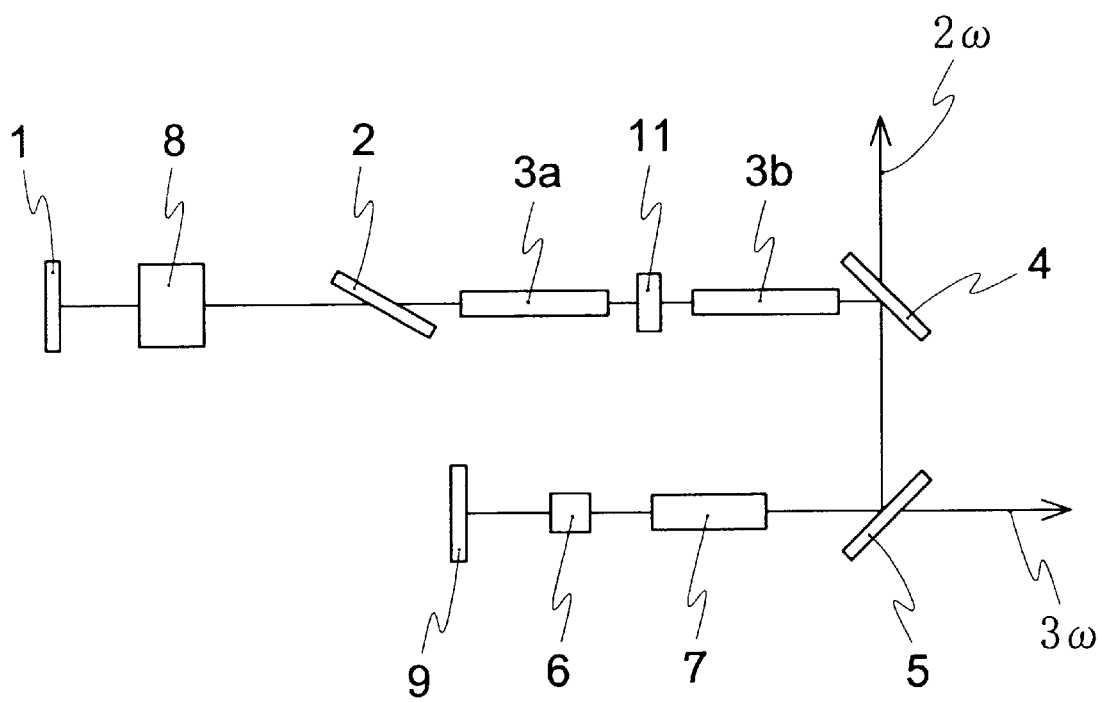
FIG. 11 is a drawing showing an arrangement of the tenth embodiment according to the present invention.

FIG. 11 is a schematic view that shows a construction in accordance with Embodiment 10 of the present invention. In FIG. 11, reference numerals 3a, 3b are solid-state laser active mediums and 11 is a 90° polarizing rotator serving as a polarizing element.

In the wavelength conversion laser constructed as shown in FIG. 11, the 90° polarization rotator 11, placed between the two solid-state laser active mediums 3a and 3b, is used in the wavelength conversion laser so as to cancel (compensate for) the thermal birefringence that depends on the polarization direction caused by heat generation inside the solid-state laser active medium exerted by pumping light and oscillated laser beam; thus, it becomes possible to widen the area of pumping intensity in which the sum frequency laser beam is generated in a stable manner, to further improve the stability and reproducibility, and also to increase the oscillation efficiency. Moreover, in the sum frequency generation device shown in FIG. 11, the length of the second harmonic generation wavelength conversion crystal 6 is set shorter than the sum frequency generation wavelength conversion crystal 7 so that it becomes possible to construct a stable laser device with high reproducibility that can be easily handled.

Embodiment 11

Figure 12:
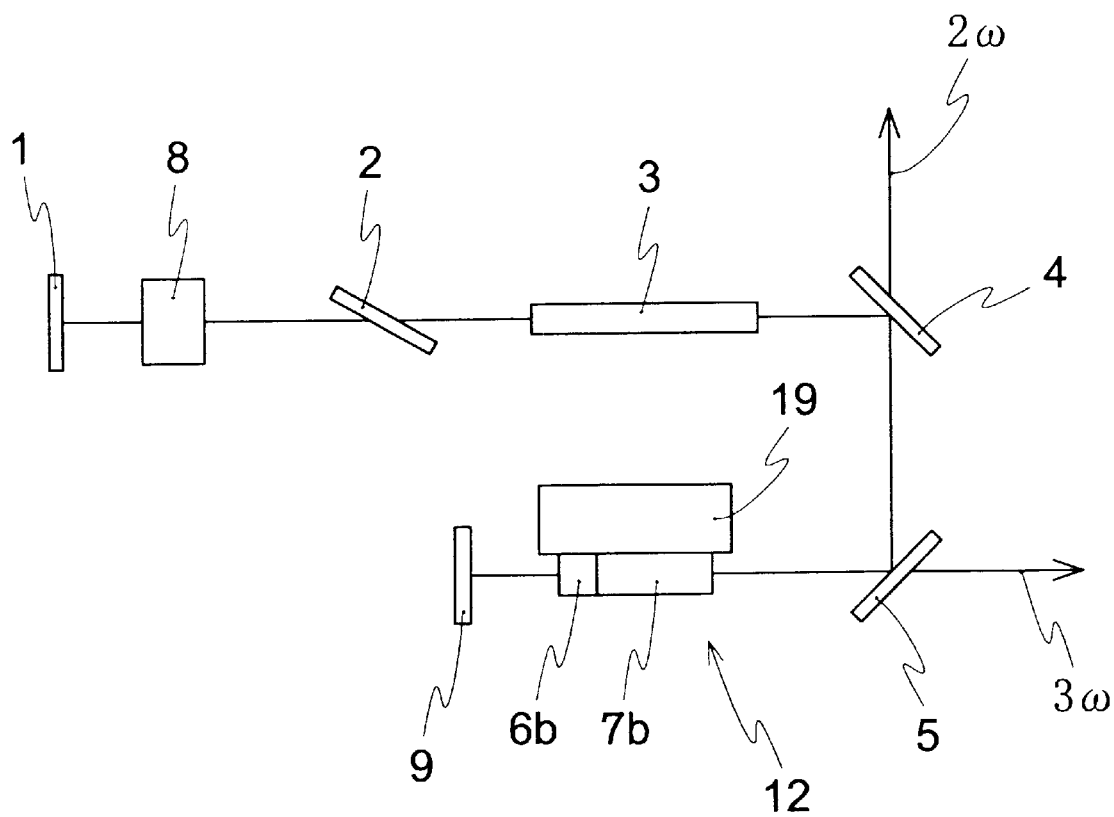
FIG. 12 is a drawing showing an arrangement of the eleventh embodiment according to the present invention.

FIG. 12 is a schematic view that shows a construction of Embodiment 11 of the present invention. In FIG. 12, reference numeral 12 is a wavelength conversion element in which the two wavelength conversion crystals, that is, the sum frequency generation wavelength conversion crystal 7b and the second harmonic generation wavelength conversion crystal 6b are integrated by means of diffusion bonding or fixed in the same wavelength conversion crystal holder. The wavelength conversion element 12, in which the second harmonic generation wavelength conversion crystal and the sum frequency generation wavelength conversion crystal are integrally placed, is provided with a mechanism 19 that carries out phase matching processes such as varying the temperature integrally, setting the refractive index of the wavelength conversion crystal (which varies depending on temperatures) to a predetermined value and finely adjusting the angles. Moreover, the second harmonic generation wavelength conversion crystal 6b constituting the integrated wavelength conversion element 12 is set shorter than the sum frequency generation wavelength conversion crystal 7b.

In the wavelength conversion laser shown in FIG. 12, a linearly polarized fundamental pulse laser beam is generated by the laser resonator mirrors 1, 4 and mirrors 5, 9, the solid-state laser active medium 3, the polarizing element 2 and the Q switch element 8, and one portion of this beam is converted to a second harmonic laser beam by the second harmonic generation wavelength conversion crystal 6b constituting the wavelength conversion element 12 placed inside the laser resonator. One portion of the second harmonic laser beam thus generated and one portion of the fundamental laser beam that has not been converted to the second harmonic laser beam are converted into a sum frequency laser beam by the sum frequency generation wavelength conversion crystal 7b of the wavelength conversion element 12. The sum frequency laser beam thus generated is extracted from the mirror 5, and the second harmonic laser beam is extracted from the mirror 4.

In the wavelength conversion laser shown in FIG. 12, upon constructing the wavelength conversion element 12 in which the second harmonic generation wavelength conversion crystal 6b and the sum frequency generation wavelength conversion crystal 7b are integrated, it is necessary to set the second harmonic generation wavelength conversion crystal 6b and the sum frequency generation wavelength conversion crystal 7b so as to increase the overlapped portion of their phase match angle tolerances. Here, it has been known that the wavelength conversion crystal is phase matching angle varies depending on the temperature of the crystal. However, in general, there is a difference in the way how the angle varies (the direction in which the phase matching angle varies, and the magnitude of the variation) between the second harmonic generation wavelength conversion crystal 6b and the sum frequency generation wavelength conversion crystal 7b; therefore, in case when a high output power sum frequency generation laser is constructed by using the arrangement as shown in FIG. 12, a temperature change occurs in the wavelength conversion element 12 by the high average output power, resulting in changes in the phase matching angles in different magnitudes and in different directions between the second harmonic generation wavelength conversion crystal 6b and the sum frequency generation wavelength conversion crystal 7b. In order to provide a proper phase matching process even in such a case, it is necessary to widen the phase matching angle tolerance to a level raising no problem in practical use. As illustrated in FIG. 12, in the present embodiment, since the length of the second harmonic generation wavelength conversion crystal 6b is set shorter than the sum frequency generation wavelength conversion crystal portion 7b so that the phase match angle tolerance of the second harmonic wavelength conversion crystal 6b can be set wider, thereby making it possible to easily manufacture a wavelength conversion element 12. Moreover, it is possible to construct a device having sufficient tolerance with respect to variations in the phase matching angle due to temperature variations that occur upon generating a high output power laser beam.

Embodiment 12

Figure 13:
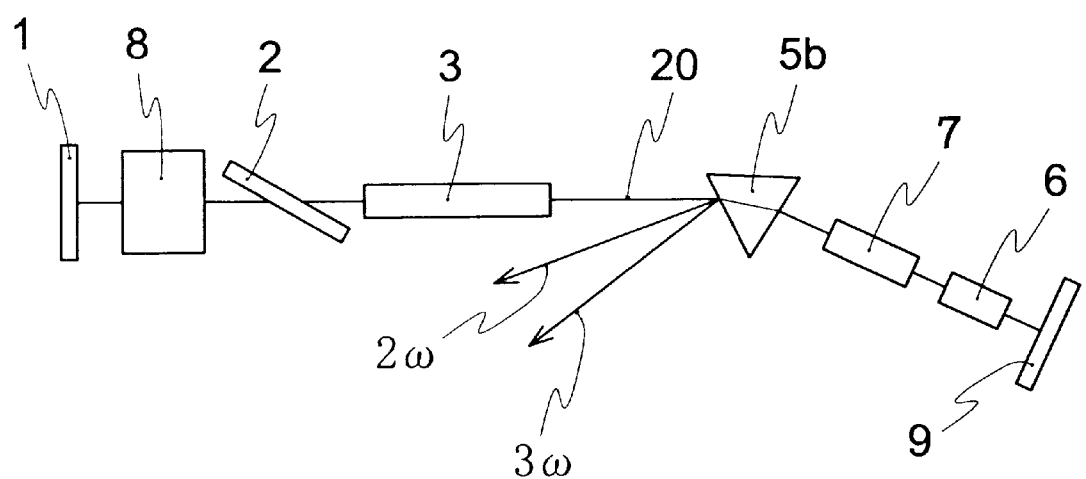
FIG. 13 is a drawing showing an arrangement of the twelfth embodiment according to the present invention.

FIG. 13 is a schematic view that shows a construction of Embodiment 12 of the present invention. Here, instead of the mirrors 4 and 5 of FIG. 1, a laser beam separation optical element 5b utilizing wavelength dispersion in the refractive index such as a prism is adopted, and by using the laser beam separation optical element, separation is carried out to the fundamental wave, the second harmonic laser beam (2ω in FIG. 13) and the third harmonic laser beam (3ω in FIG. 13) serving as the sum frequency laser beam. In this arrangement also, the same operation as that of FIG. 1 can be carried out, and it is possible to provide a stable laser device with high reproducibility.

Embodiment 13

Figure 14:
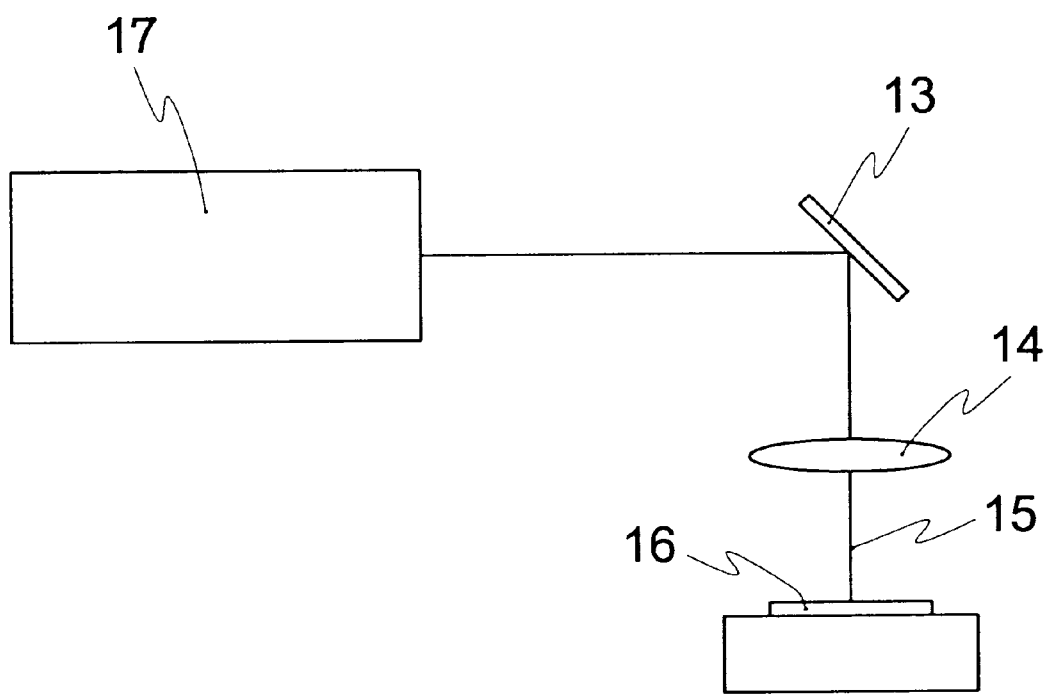
FIG. 14 is a drawing showing an arrangement of the thirteenth embodiment according to the present invention.
Figure 15:
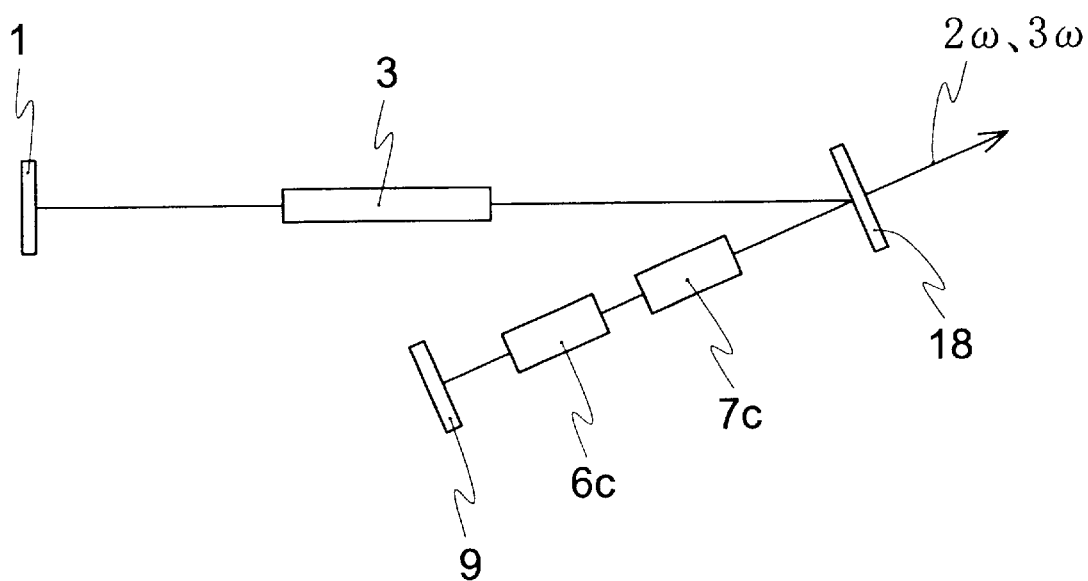
FIG. 15 is a drawing showing an arrangement of a conventional wavelength conversion laser.

FIG. 14 is a schematic view that shows a construction of Embodiment 13 of the present invention. In FIG. 14, reference numeral 17 is a laser machining device light source which is constituted by any one of the wavelength conversion lasers shown in FIGS. 1, 10, 11, 12 and 13. Reference numeral 13 is a laser beam folding mirror, 14 is a laser beam shaping and converging element such as a lens, 15 is a laser beam used for machining and 16 is a machining object.

In the laser machining device having the arrangement shown in FIG. 14, the laser beam generated from any one of the wavelength conversion lasers 17 shown in FIGS. 1, 10, 11, 12 and 13 is folded by the folding mirror 13, shaped and focused by the element 14, and made incident on the machining object 16 so as to be machined.

In the laser machining device constructed as shown in FIG. 14, since a laser beam, which is generated stably with high reproducibility by any one of the wavelength conversion lasers 17 shown in FIGS. 1, 10, 11, 12 and 13, is used, it is possible to carry out a stable machining process with high reproducibility. Moreover, even if any of the constituent parts of the wavelength conversion laser 17 (optical parts such as a semiconductor laser and lamps in the pump source, wavelength conversion crystals, and mirrors) is damaged and needs to be exchanged, the adjustments are easily carried out and the adjustments for the optical system and the resonator can be completed in a short time; therefore, it is possible to easily bring the laser device to the state before the repair and also to reproduce the machining before the repair under the same operation conditions before the repair. In this manner, the laser machining device that uses any one of the wavelength conversion lasers 17 shown in FIGS. 1, 10, 11, 12 and 13 is superior in its stability and can provide machining with high reproducibility.

The present invention that has the arrangements as described above exhibit the following effects.

The laser in accordance with claim 1 of the present invention, which is a wavelength conversion laser having a second harmonic generation wavelength conversion crystal and a sum frequency generation wavelength conversion crystal that are placed on the laser optical axis in a laser resonator containing a solid-state laser active medium, is designed so that the length in the optical axis direction of the second harmonic generation wavelength conversion crystal is shorter than the length in the optical axis direction of the sum frequency generation wavelength conversion crystal; therefore, it is possible to simplify the output power characteristic of the sum frequency laser beam that depends on the angle of the second harmonic generation wavelength conversion crystal, and consequently to construct a wavelength conversion laser with high reproducibility and ease in handling.

The laser in accordance with claim 2, which is the same laser as claim 1, is designed so that the sum frequency generation wavelength conversion crystal serves as a wavelength conversion crystal for generating a third harmonic laser beam; therefore, it is possible to simplify the output power characteristic of the third harmonic laser beam that depends on the angle of the second harmonic generation wavelength conversion crystal, and consequently to construct a wavelength conversion laser with high reproducibility and ease in handling.

The laser in accordance with claim 3, which is the same wavelength conversion laser as claim 1, is designed so that the sum frequency generation wavelength conversion element is made of a plurality of wavelength conversion crystals; therefore, it is possible to simplify the output power characteristic of the sum frequency laser beam that depends on the angle of the second harmonic generation wavelength conversion crystal, and consequently to construct a wavelength conversion laser with high reproducibility and ease in handling.

The laser in accordance with claim 4, which is the same wavelength conversion laser as claim 3, is designed so that the sum frequency generation wavelength conversion crystal is constituted by two wavelength conversion crystals so as to generate fourth harmonic laser beam; therefore, it is possible to simplify the output power characteristic of the fourth harmonic beam that depends on the angle of the second harmonic generation wavelength conversion crystal, and consequently to construct a wavelength conversion laser with high reproducibility and ease in handling.

The laser in accordance with claim 5, which is the same wavelength conversion laser device as claim 1, is designed so that the sum frequency generation wavelength conversion crystal is arranged so as to be positioned between the solid-state laser active medium and the second harmonic generation wavelength conversion crystal; therefore, it is possible to provide a stable device with high reproducibility.

Furthermore, the laser in accordance with claim 6, which is the same wavelength conversion laser as claim 1, is designed so that a resonator Q value modulating element is placed inside a laser resonator; therefore, the wavelength conversion efficiency becomes higher than at the time of continuous wave operation. In this case also, it is possible to smooth and simplify the second harmonic output power variation that depends on the wavelength conversion crystal angle, and the fundamental power variation inside the resonator, and consequently to simplify the angle dependence of the sum frequency laser beam output power on the second harmonic generation wavelength conversion crystal; thus, it becomes possible to construct a wavelength conversion laser with ease in handling.

The laser in accordance with claim 7, which is the same wavelength conversion laser as claim 1, is designed so that a mechanism, which can finely adjust the angle of at least one of the wavelength conversion crystals with a precision of not more than ±0.1 degree, is installed; therefore, the handling of the wavelength conversion laser, which has conventionally been difficult due to the complex angle dependence, can be made easier.

The laser in accordance with claim 8, which is the same wavelength conversion laser as claim 1, is designed so that a mechanism, which can finely adjust the temperature of at least one of the wavelength conversion crystals with a precision of not more than ±0.5 degree, is installed; therefore, the handling of the wavelength conversion laser, which has conventionally required the temperature control of the wavelength conversion crystal and has conventionally been difficult due to the complex angle dependence of the wavelength conversion crystal, can be made easier.

The laser in accordance with claim 9, which is the same wavelength conversion laser as claim 1, is designed so that a polarization controlling element is placed inside the laser resonator; therefore, it is possible to improve the stable wavelength conversion laser with high reproducibility and high efficiency so as to have higher reproducibility and ease in handling.

The laser in accordance with claim 10, which is the same wavelength conversion laser as claim 1, is designed so that Nd:YAG or Nd:YLF or Nd:YVO$_4$ is used as the solid-state laser active medium; therefore, it is possible to improve the stable wavelength conversion laser with high reproducibility, high efficiency, and a short pulse width, so as to have higher reproducibility and ease in handling.

The laser in accordance with claim 11, which is the same wavelength conversion laser as claim 1, is designed so that LBO(LiB$_3$O$_5$) crystal is used at least either as the second harmonic generation wavelength conversion crystal or as the third harmonic generation wavelength conversion crystal; therefore, it is possible to improve the stable wavelength conversion laser with high reproducibility and high generation efficiency, so as to have higher reproducibility and ease in handling.

The laser in accordance with claim 12, which is the same wavelength conversion laser as claim 1, is designed so that the sum frequency laser beam has an average output power of not less than 1 W. In such a device, even under the condition that there is a deviation in the phase matching angle due to thermal distortion, damages to the optical elements and temperature variations in the wavelength conversion crystal, since the second harmonic generation wavelength conversion crystal is short and the phase matching angle tolerance is wide, it is possible to construct a stable wavelength conversion laser with high reproducibility and high generation efficiency that can be handled easily even in case when the average output power is high.

The laser in accordance with claim 13, which is the same wavelength conversion laser as claim 1, is designed so that the second harmonic generation wavelength conversion crystal and the sum frequency generation wavelength conversion crystal are integrally formed into a wavelength conversion element so as to integrally vary the temperature or angle of the second harmonic generation wavelength conversion crystal and the sum frequency generation wavelength conversion crystal. In such a device, even in case when the wavelength conversion crystals are subjected to temperature changes even though the sum frequency generation wavelength conversion crystal and the second harmonic generation wavelength conversion crystal, which are generally different in the way how the phase matching angle tolerance varies due to temperatures, are integrally formed, the arrangement is made so that the phase matching angle tolerances of the two crystals are allowed to overlap to a level that raises no problem in practical use; therefore, it is possible to construct a stable laser.

The machining device in accordance with claim 14 is a laser machining device for machining a machining object by using a wavelength conversion laser beam generated by the wavelength conversion laser disclosed in claim 1 as a light source; therefore, it is possible to provide an inexpensive device which can carry out machining with high reproducibility and high precision, stably for a long time, and his device also allows easy maintenance.

What is claimed is:

1. A wavelength conversion laser for generating sum frequency laser beam comprising:
    a laser resonator;
    a solid-state active medium;
    a second harmonic generation wavelength conversion crystal; and
    a sum frequency generation wavelength conversion crystal,
    wherein the solid-state laser active medium, the second harmonic generation wavelength conversion crystal and the sum frequency generation wavelength conversion crystal are set in the laser resonator, and
    wherein a length of the second harmonic generation wavelength conversion along an optical axis is set to be shorter than that of the sum frequency generation wavelength conversion crystal.

2. The wavelength conversion laser of claim 1, wherein the sum frequency generation wavelength conversion crystal serves as a third harmonic generation wavelength conversion crystal.

3. The wavelength conversion laser of claim 1, wherein the sum frequency generation wavelength conversion crystal comprises a plurality of wavelength conversion crystals.

4. The wavelength conversion laser of claim 3, wherein the sum frequency generation wavelength conversion crystal comprises two wavelength conversion crystals so as to generate fourth harmonic laser beam.

5. The wavelength conversion laser of claim 1, wherein the sum frequency generation wavelength conversion crystal is positioned between the solid-state laser active medium and the second harmonic generation wavelength conversion crystal.

6. The wavelength conversion laser of claim 1, further comprising a resonator Q value modulating element in the resonator.

7. The wavelength conversion laser of claim 1, further comprising an angle adjusting means, which adjusts an angle of at least one of the wavelength conversion crystals with a precision not more than ±0.1 degree.

8. The wavelength conversion laser of claim 1, further comprising a temperature adjusting means which adjust a temperature of at least one of the wavelength conversion crystals with a precision of not more than ±0.5 degree centigrade.

9. The wavelength conversion laser of claim 1, further comprising a polarization controlling element in the resonator.

10. The wavelength conversion laser of claim 1, wherein the solid-state laser active medium consists of one of the group of Nd:YAG, Nd:YLF and Nd:YVO$_4$.

11. The wavelength conversion laser of claim 1, wherein a LBO (LiB$_3$O$_5$) crystal is used at least either as the second harmonic generation wavelength conversion crystal or as the sum frequency generation wavelength conversion crystal.

12. The wavelength conversion laser of claim 1, wherein an output power of the sum frequency laser beam is not less than 1 Watt.

13. The wavelength conversion laser of claim 1, wherein the second harmonic generation wavelength conversion crystal and the sum frequency generation wavelength conversion crystal are formed into an integrated wavelength conversion element so as to adjust integrally a temperature or an angle of the wavelength conversion crystals.

14. A laser machine device for machining a machining object including a wavelength conversion laser providing an output laser beam to an optical element configured to shape the output laser beam into a machining laser beam and to make the machining laser beam incident on the machining object, said wavelength conversion laser comprising:

a laser resonator;

a solid-state laser active medium;

a second harmonic generation wavelength conversion crystal; and a sum frequency generation wavelength conversation crystal, wherein a length of the second harmonic generation wavelength conversion crystal along an optical axis is set to be shorter than that of the sum frequency generation wavelength conversion crystal, wherein the wavelength conversion laser has an output laser beam providing portion, and further wherein the solid-state laser active medium, the second harmonic generation wavelength conversion crystal, and the sum frequency generation wavelength conversion crystal are set in the laser resonator.

* * * * *